James V. Johnston
Guilford J. Hutcheson, Jr.
INVENTORS.

United States Patent Office 3,613,458
Patented Oct. 19, 1971

3,613,458
LASER PICKOFF FOR STRAPDOWN
GYROSCOPIC ACCELEROMETER
James V. Johnston and Guilford J. Hutcheson, Jr., Huntsville, Ala., assignors to the United States of America as represented by the Secretary of the Army
Filed Jan. 8, 1970, Ser. No. 1,479
Int. Cl. G01p 15/08
U.S. Cl. 73—504
6 Claims

ABSTRACT OF THE DISCLOSURE

The shaft of a strapdown gyroscope rotor is attached at one end to the housing of an accelerometer. The other end of the shaft has a pair of fully reflective mirrors orthogonally carried thereon. The other end of the shaft is free to move. A laser and beam splitter is mounted to split the beam into two optical paths. A detector with a partially reflective mirror at its input is positioned in each optical path. Each detector responds to Doppler shift of the beam reflected back from the fully reflective mirror.

BACKGROUND OF THE INVENTION

This invention is in the field of pickoffs for detecting strapdown gyroscopic accelerometer outputs. Known strapdown gyroscopic accelerometers obtain outputs from capacitive or inductive pickoffs. The outputs depend upon physical movement of the gyroscope shaft. These pickoffs are insensitive to minute movement of the gyroscope shaft. The current invention is able to measure minute movements of the gyroscope shaft along two orthogonal axes by detecting the phase shift of light beams. The known accelerometers usually sense acceleration in only one direction, and two must be used to obtain acceleration for orthogonal axes.

SUMMARY OF THE INVENTION

The present invention is a laser pickoff for detecting minute output information from a strapdown gyroscopic accelerometer. One end of the rotor shaft of the strapdown gyroscope is attached to a housing. The other end of the shaft is free to move and has two fully reflective mirrors orthogonally carried thereon. A laser and beam splitter is mounted to split the beam into two optical paths. These optical paths furnish two axis information from the gyroscopic accelerometer, such as pitch and yaw information. A detector with a partially reflective mirror at its input is positioned in each optical path. Any movement of the shaft and fully reflective mirrors due to acceleration of the housing causes the optical path lengths to change accordingly. The change in optical path length causes a Doppler shift in the beam reflected back from the fully reflective mirror. The detector responds to the Doppler shift and produces a beat frequency at its output.

DESCRIPTION OF THE PREFERRED EMBODIMENT

Figure 1:
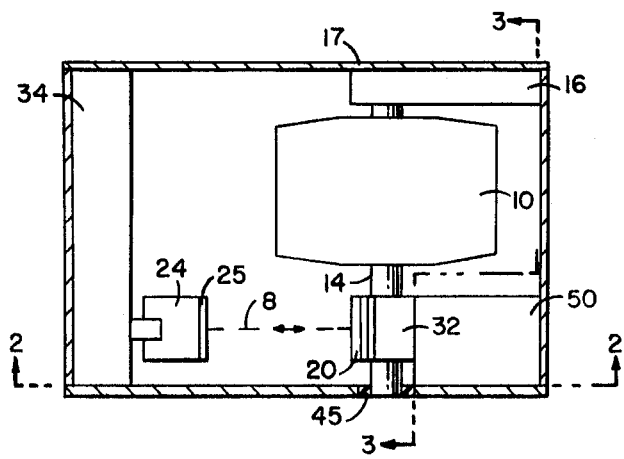
FIG. 1 is a plan view of a strapdown gyroscopic accelerometer and laser pickoff of the present invention.

Referring to the plan view of FIG. 1, there is shown a housing 17 in which gyroscope rotor 10 is supported by bearings (not shown) on shaft 14. Shaft 14 is rigidly connected to pillow block 16 at one end, but has sufficient flexibility for slight movement in resilient material 45 at the other end.

Figure 2:
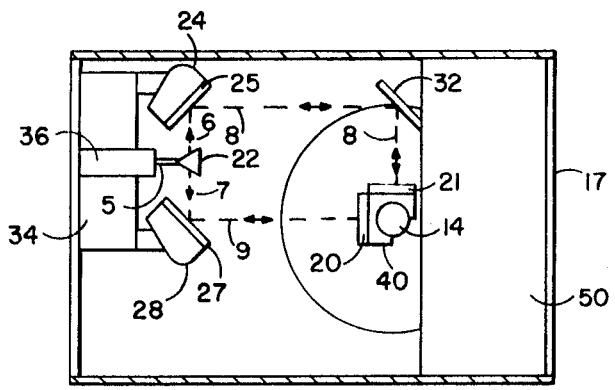
FIG. 2 is a sectional view of the present invention taken through section 2—2 of FIG. 1.
Figure 3:
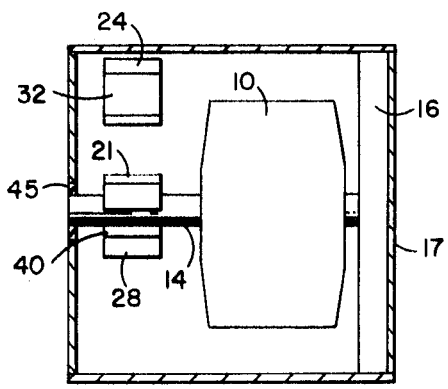
FIG. 3 is a sectional view of the present invention taken through section 3—3 of FIG. 1.

Refer now to FIG. 2 along with FIG. 1 for a detailed description of the inventive laser pickoff of the strapdown gyroscopic accelerometer output signals. A laser beam source 36, such as a helium-neon gas laser, produces a continuous laser beam 5, at a selected wave length, for example 1.15 microns. Laser beam 5 is split into two reference laser beams 6 and 7 by beam splitter 22, such as a roof prism, for producing two axes of information. Beam 6 strikes a first partially reflective mirror 25, positioned at the input of first laser detector 24. Part of beam 6 is applied to detector 24, made of a material such as gallium-arsenide, and the remainder is reflected as beam 8. Beam 8 is reflected from fully reflective mirror 32, to fully reflective mirror 21. Mirror 32 is attached to support 50 that is, in turn, attached to housing 17. Mirror 21 attached to shaft block 40, and block 40 is attached to shaft 14. Beam 8 is reflected back and enters detector 24 for frequency comparison with beam 6. Paths 6 and 8 provide one axis of information, assumed to be the pitch axis information.

Beam 7 strikes a second partially reflective mirror 27, positioned at the input of second laser detector 28. A portion of beam 7 is reflected as beam 9 to fully reflective mirror 20. Mirror 20 is attached to shaft block 40, 90° from mirror 21. Beam 9 is reflected back and enters detector 28 for frequency comparison with beam 7. Paths 7 and 9 provide yaw axis information.

In operation of the laser pickoff for a strapdown gyroscope, when rotor 10 is forced to move from its preferred orientation by acceleration of housing 17, a pressure is exerted on shaft 14. The pressure on shaft 14 causes movement of either or both of mirrors 21 and 20. Movement of mirrors 21 and 20 changes the optical path lengths of laser beams 8 and 9. Beams 8 and 9 will return to detectors 24 and 28 with a beat frequency or Doppler shift. The beat frequency or Doppler shift of beams 8 and 9 are respectively beat with the frequency of beams 6 and 7 to furnish difference frequencies at the outputs of detectors 24 and 28.

While a specific embodiment of the invention has been shown and described, other embodiments may be obvious to one skilled in the art in light of this disclosure. An example is that a photomultiplier or photodiode may be used for the laser detector. Although a specific wave length is given, it should be understood that any one of various wave lengths may be used. In spite of the fact that this disclosure has not mentioned angular accelerations and their effects on the invention, it is recognized that such accelerations would act as error signals to desired acceleration output signals. Likewise, angular vibrations and linear vibrations would act as error signals. The manner by which these error signals may be separated from the desired acceleration signals is well known in the art as taught, for example, by J. A. Thompson, in his paper entitled "Inertial Sensor Performance in a Strapdown Environment," appearing on pages 1–17 in the report of the AIAA Guidance and Control Conference, Seattle, Washington, Aug. 15–17, 1966.

We claim:
1. An extended dynamic range laser pickoff for a strapdown gyroscope accelerometer comprising: a housing; a shaft within said housing with one end attached thereto; a gyroscopic rotor mounted on said shaft; a laser mounted within said housing; means for defining first and second optical paths including: means for splitting the beam from said laser into first and second beams, first and second fully reflective mirrors orthogonally carried by the other end of said shaft, with their surfaces parallel to the axis of the shaft, and first and second partially reflective mir- rors in said first and second beams; and first and second detectors mounted behind said first and second partially reflective mirrors.

2. A laser pickoff as set forth in claim 1 wherein said first and second fully reflective mirrors are oriented to reflect said first and second beams back along said first and second optical paths wherein said detectors respond to Doppler shift of said beams in said optical paths.

3. A laser pickoff as set forth in claim 2 wherein said laser is helium-neon.

4. A laser pickoff as set forth in claim 3 wherein said first and second detectors are laser detectors.

5. A laser pickoff as set forth in claim 4 wherein said first and second detectors are gallium-arsenide.

6. A laser pickoff as set forth in claim 5 wherein said means for splitting the beam is a roof prism.

References Cited
UNITED STATES PATENTS

| | | | |
|---|---|---|---|
| 2,878,006 | 3/1959 | Sedgfield et al. | 73—504 X |
| 3,328,595 | 6/1967 | Todd, Jr. | 74—5.6 X |
| 3,435,656 | 4/1969 | Jordan et al. | 73—71.3 X |

JAMES J. GILL, Primary Examiner

U.S. Cl. X.R.

356—28